INVENTOR
Wolfgang Karl Schmid

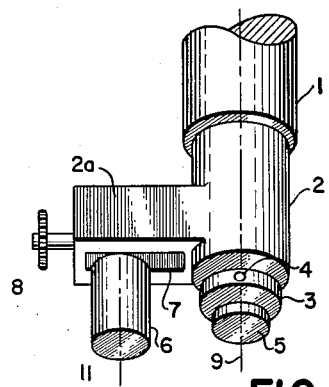
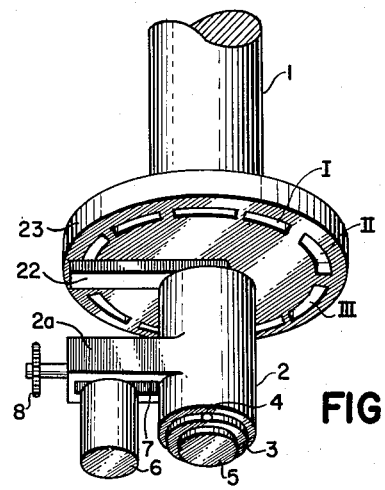
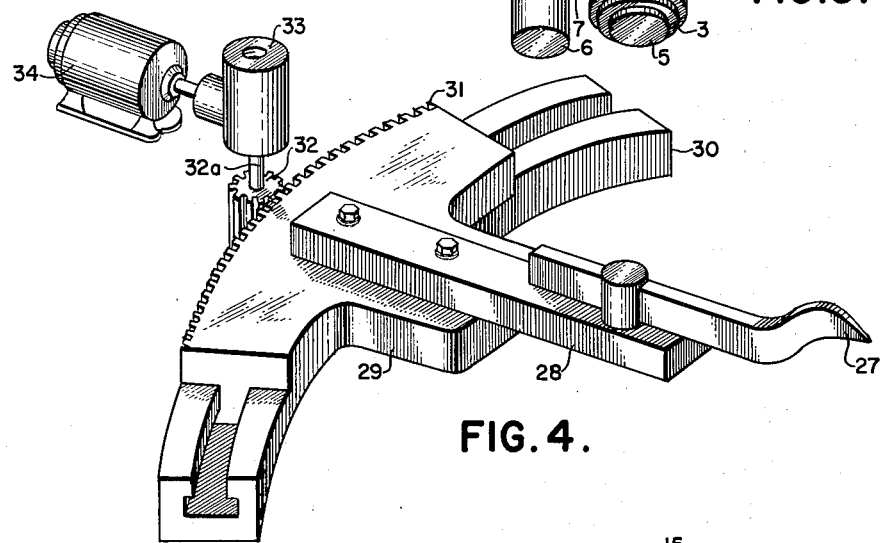
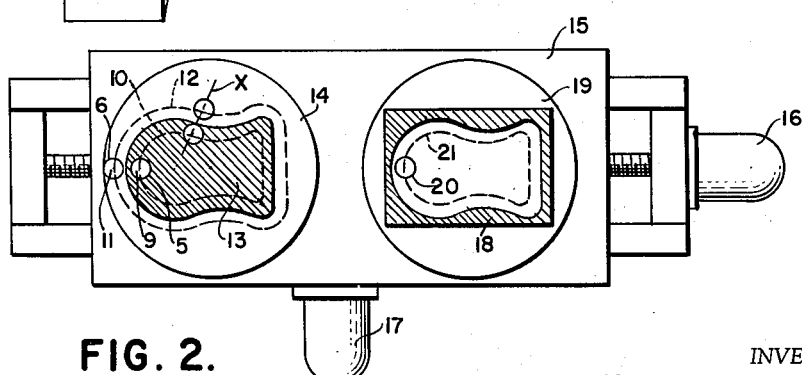

March 28, 1961

W. K. SCHMID 2,976,778

FEELER CONTROLS

Original Filed Dec. 3, 1953

INVENTOR
Wolfgang Karl Schmid

BY George M Spencer

ATTORNEY

United States Patent Office 2,976,778
Patented Mar. 28, 1961

2,976,778

FEELER CONTROLS

Wolfgang Karl Schmid, Gagny, France
(% Anna Ponelat, Kirchweg 78, Kassel, Germany)

Continuation of application Ser. No. 396,045, Dec. 3, 1953. This application Sept. 24, 1959, Ser. No. 842,036

5 Claims. (Cl. 90—62)

The present invention is a continuation of my U.S. patent application, Serial No. 396,045, filed December 3, 1953, now abandoned, and relates to a feeler control mechanism for copying contours.

It has been known in the art to employ for this purpose templates having the same contour form to be transmitted to the finished workpiece. Since it is practicably impossible to work with milling tools which are as thin as a needle, it is necessary to prepare two templates for finishing punches and dies, i.e., one template having an outer contour upon which a feeling pin travels having the same diameter as the milling tool, and a corresponding template having an inner contour for copying the die.

In contradistinction, the present invention provides a solution to this problem enabling successful operation to be achieved by means of a single template. To this end, an auxiliary feeler is secured to a feeler spindle supporting the main feeler in such a manner that the center of this main feeler spindle defines a path of travel diffferent from that defined by the movement of the center of the auxiliary feeler. This auxiliary feeler may be attached to any conventional feeler and has the advantage that not only a single template is required, but additionally a higher degree of accuracy in the dimensions is attained because both parts, the punch and the die, are copied from the same template.

A further embodiment of the present invention permits automatic adjustment of the work tool in relation to the position of the tangent of a contour. In such device the adjustment of the tool is carried out by means of the auxiliary feeler which actuates a special control member and the tool is always adjusted so that it is normal to the tangent of the contour. Such an automatic adjustment of the tool into a working position orthogonal to the tangent of the workpiece contour considerably increases the number of possible applications with which such feeler controls may be employed. For example, in irregularly formed welding seams it is essential that the welding burner be positioned at right angles to the tangent of the welding seam. The present invention further makes possible automatic operation of shaping tools for the punch and die, the shaping tool automatically adjusting itself into a position which is always normal to the tangent of the contour. The contour of the template is scanned by the main feeler in a manner known in the art, and at the same time by means of the auxiliary feeler the shaping tool is held in a predetermined angular position with respect to the contour.

It is an important object of the present invention to provide means enabling a tool to be positioned at a predetermined angle with respect to the tangent line taken along the contour of a workpiece.

It is another important object of the present invention to provide a device wherein both an auxiliary feeler and a tool are disposed at right angles to the respective tangent lines taken along the contour of a template and a workpiece, and the tool is adjusted in accordance with the movement of the auxiliary feeler.

It is still another object of the present invention to provide control means responsive to the movement of an auxiliary feeler along the surface of a template, whereby a tool is accurately positioned at right angles to a tangent line taken along the contour of a workpiece.

A further object of the present invention is to provide means permitting a workpiece to be copied from a single template with greater accuracy and celerity.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

Figure 1 illustrates perspectively an embodiment of the present invention showing an adjustable auxiliary feeler for copying the inner contours according to a template having a corresponding outer contour;

Figure 2 shows in top view the various positions of the axis of the principal feeler during the scanning of the contour of a template;

Figure 3 illustrates perspectively a feeler with an attached auxiliary feeler according to this invention and a wiper arm slidable along a contact bank member;

Figure 4 shows perspectively a device for positioning a shaping tool in accordance with this invention;

Figure 5:
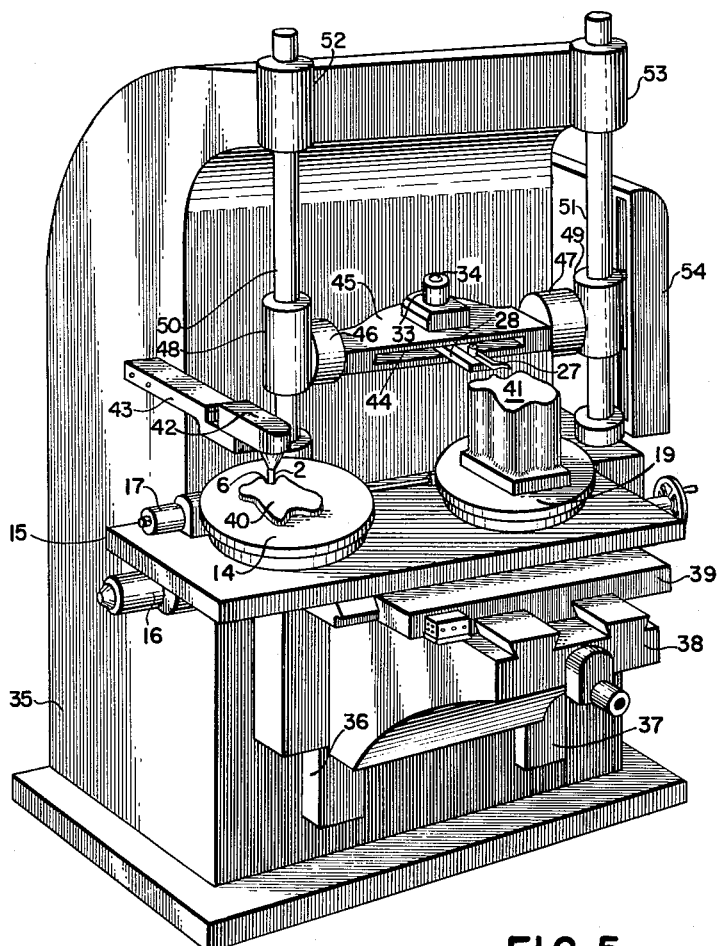
Figure 5 illustrates perspectively a punch and die shaping machine controlled by feelers according to the present invention.

Referring now to the drawings, and more particularly to Figure 1 thereof, an embodiment of an auxiliary feeler is illustrated which is adapted to copy the inner contour of a template, said contour corresponding to the outer contour of a workpiece. On a scanning spindle 1 for a main feeler or scanning pin 5 there is freely rotatably mounted a sleeve 2 having a laterally extending leg 2a, said sleeve being journaled on the lower end of the spindle 2 and held by a ring 3 secured to the main feeler or scanning pin 5 by means of a suitable fastening member such as a set screw 4. An auxiliary feeler or scanning pin 6 is slidably arranged within a slot 7 provided in the leg 2a of the sleeve 2, the distance of the auxiliary feeler 6 from the scanning pin 5 being adjustable by means of an adjusting screw 8. The auxiliary scanning pin 6 is interchangeable so as to adapt its diameter to that of the particular milling tool to be controlled thereby.

Figure 2 discloses the various positions assumed by the main feeler 5 and the auxiliary feeler 6 during the scanning of the contour of a template 13 mounted on a rotary table 14. The longitudinal axis 9 of the main feeler 5 travels along a path 10 and the longitudinal axis 11 of the auxiliary feeler 6 moves along a path 12. While the template 13 is secured to the rotary table 14, a workpiece 18 is attached to a rotary table 19. These two rotary tables are supported side by side on a longitudinal table 15. This longitudinal table is adapted to be driven, i.e. displaced in the longitudinal direction via a driving mechanism 16, for example via an electromagnetic clutch. The two rotary tables 14 and 19 are rotated by a suitable driving unit or electromagnetic reversing clutch 17. The workpiece 18 is milled by a milling tool 20, the axis of which travels along a path 21. Since the main feeler 5 and the milling tool 20 are rigidly connected to one another, the path 21 of the latter corresponds exactly to the path 10 of the feeler 5. Thus, the main feeler 5 and the milling tool 20 are fixed in space and the template 13 and the workpiece 18 are displaced simultaneously in such a manner that the milling tool 20 cuts an inner contour into the workpiece 18 which corresponds exactly with the outer contour of the template 13 scanned by the auxiliary feeler. The two rotary tables 14 and 19 are rotated during the scanning of the template 13 in a similar manner to that disclosed in applicant's United States Patent No. 2,814,237 issued November 26, 1957, whereby the auxiliary feeler 6 assumes various angular positions with respect to the main feeler 5 as clearly shown in Figure 2. During the scanning operation the auxiliary feeler 6 is automatically swung about the axis 9 of the main feeler 5 in such a manner that a line $x$ through the centers of the feelers 5 and 6 is normal to the tangent of the contour of the template 13.

In Figure 3 there is shown a main feeler 5 with the rotatably mounted auxiliary feeler 6 actuating a sliding contact or wiper arm 22 secured to the sleeve 2 and slidable along a contact bank member 23 mounted on the spindle 1. The auxiliary feeler 6 swingably or pivotably arranged about the main scanning pin 5 displaces the contact or wiper arm 22 with respect to the contacts on the bank member 23. This contact bank member 23 attached to the scanning spindle 1 is provided with several contact pieces I, II, III etc. which are electrically insulated with respect to one another and the supporting bank member 23. If the auxiliary feeler 6 is displaced during the scanning of the contour of the template 13 the wiper arm 22 slides along the contact bank member 23 and thereby controls the working position of the tool through the intermediary of an adjusting or control device shown in Figure 4.

This device is adapted to control a tool 27 which in the embodiment of Figure 4 is a shaping tool 27 attached to a tool holder plate 28 secured to a base member 29. The latter is a rack segment slidable in a T-shaped guideway of an arcuate member 30. The base member 29 with its rack 31 engages a pinion 32. This pinion is mounted on the output shaft 32a of an electromagnetic reversing clutch 33 driven by a suitable motor 34.

Figure 5 shows a feeler-controlled punch and die shaping tool with an automatic adjusting device for the shaping tool 27, as described with reference to Figure 4. To the frame 35 of this machine tool there is attached a pair of guides 36 and 37 upon which a support 38 is vertically displaceable. This support 38 carries a transverse support 39 to which the longitudinal table 15 with the two rotary tables 14 and 19 is secured. A template 40 is attached to the rotary table 14 and the rotary table 19 supports a workpiece 41. The longitudinal table 15 is driven via the magnetic reversing clutch 17. A feeler mechanism 42 is attached to a supporting arm 43 carried by the machine frame 35. The sleeve 2 on the main feeler 5 carries the auxiliary feeler 6 as shown in detail in Figure 3. The shaping tool 27 similar to that in Figure 4 is attached to the tool holder plate 28 which is swingably mounted in a slot 44 provided in a tool-holding device 45. The shaping tool 27 is adapted to be swung as explained with reference to Figure 4, by means of the motor 34 via the electromagnetic reversing clutch 33. The entire tool-holding device 45 can be rotated by means of the trunnions 46 and 47 in order to provide the foot or base of the punch with an arcuate chamfer. These trunnions 46 and 47 are attached to bearing blocks or sleeves 48 and 49, respectively, slidable in vertical direction on guide rods 50 and 51 respectively, carried by the frame 35. For securing the rods 50 and 51 spaced supporting blocks 52 and 53, respectively, are attached to a traverse forming the upper part of the frame 35. The mechanism for moving the shaping tool 27 in vertical direction is disposed within a housing 54 on the right side of the machine tool. This mechanism is designed in such a manner that the shaping tool 27 on reaching the foot of the punch is rotated about the trunnions 46 and 47 whereby the desired chamfer is imparted to the foot of the punch. By virtue of the deflections of the scanning spindle 1 (Figure 3) of the feeler scanning the whole circumference of the template 40 the reversing clutches 16 and 17 are controlled as disclosed in applicant's above mentioned United States Patent No. 2,814,237. Due to the resulting swinging movement of the auxiliary feeler 6 the electromagnetic clutch 33 is controlled in such a manner that the angular position of the shaping tool 27 with respect to the workpiece 41 at any particular point thereof always corresponds to the position of the auxiliary feeler 6 which, in turn, is normal to the tangent of the contour of the template 13. The adjusting device for the shaping tool 27 is preferably designed so as to rotate or swing the shaping tool 27 about the point thereof. It will be appreciated that the auxiliary feeler 6 and the shaping tool 27 are always positioned at right angles to the respective tangent lines of the template and workpiece contours.

Figure 6:
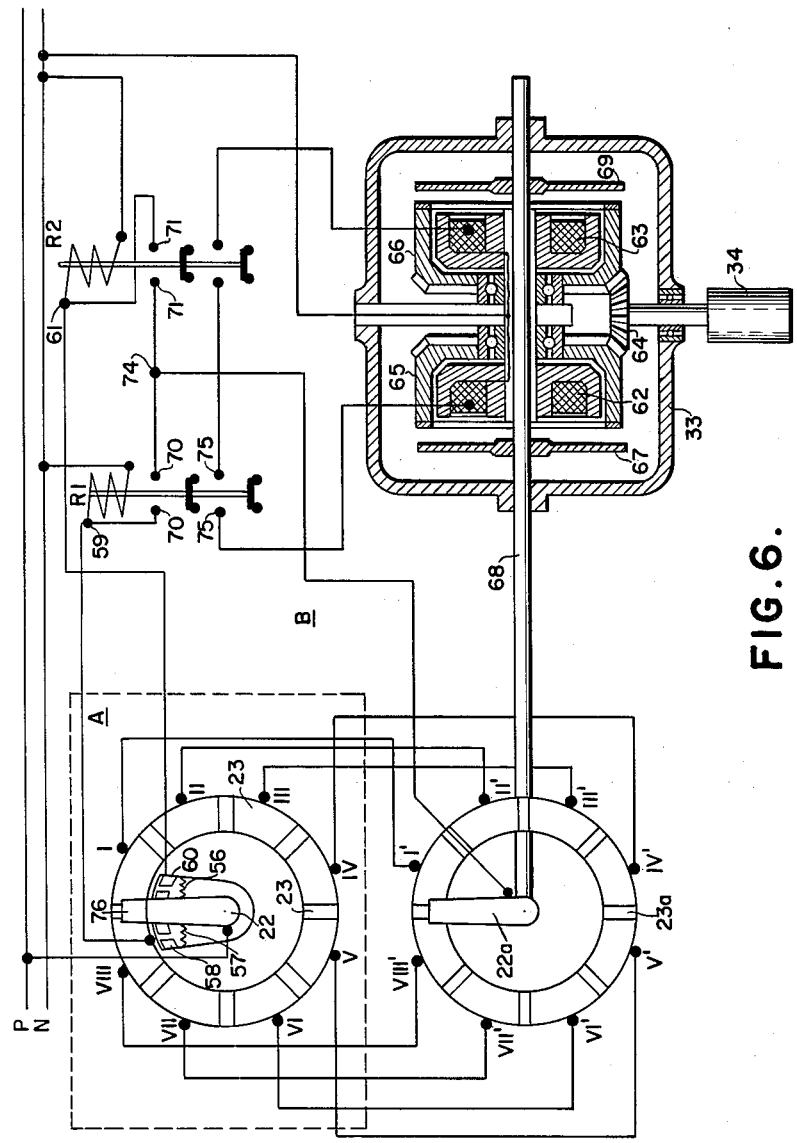
Figure 6 shows schematically an electric circuit diagram of the automatic positioning device for a shaping tool according to this invention.

Figure 6 is an example for a basic circuit diagram for an automatic adjusting device for the shaping tool 27. According to this diagram the contact bank member 23 which is attached to the scanning spindle 1 of the main feeler 5 carries eight contact pieces or segments, I to VIII. A plate member 55 is secured to the sleeve 2 (Figure 3) and is turned or adjusted by the auxiliary feeler 6 in the manner in which the wiper arm 22 is adjusted according to Figure 3. A wiper arm 22' similar to the wiper arm 22 in Figure 3 is loosely held and guided by the plate member 55 and is maintained in a neutral or central position by means of and between two springs 56 and 57. If the auxiliary feeler 6 assumes a different orientation with respect to the main feeler 5, as a result of being rotated slightly about the latter, the plate member 55 participates in this angular displacement, whereas the wiper arm 22' remains in the initial position at the outset of the displacement. Thus, if the plate member 55 is rotated, for example, in clockwise direction, the spring 57 is compressed until the wiper arm 22' engages an electric contact 58. The wiper arm 22' is insulated and connected to one terminal P of a D.C. network. When the wiper arm 22' engages the contact 58, an electric circuit through the relay winding R1 is closed via its terminal 59 connected to the contact 58 and the other relay winding terminal connected to terminal N of said D.C. network. If the plate member 55 is displaced in counterclockwise direction, the wiper arm 22' will engage an electric contact 60 resulting in closing of an electric circuit through a relay winding R2 via its terminal 61 connected to the contact 60 and the other relay winding terminal connected to terminal N of said D.C. network. Thus, windings 62 and 63 of the electromagnetic reversing clutch 22 are respectively controlled by means of the relays R1 and R2. The clutch 33 is driven by the motor 34 through a bevel gear 64 engaged by the bevel gears 65 and 66 rotating in opposite directions with respect to one another. If the winding 62 is energized a friction disc 67 is attracted so that a shaft 68 of the clutch is rotated in a predetermined direction. If the winding 63 is energized a friction disc 69 is attracted, and the shaft 68 is rotated in opposite direction. By means of the relays R1 and R2 the windings 62 and 63 of the magnetic reversing clutch can be alternately connected to the D.C. network. The two relays R1 and R2 are respectively provided with contact pairs 70 and 71 for holding the relays energized. As soon as the wiper arm 22' engages the contact 58, the relay R1 is energized and is retained in its attracted position via the holding contact pair 70. In order to obtain synchronism between the transmitting device A, comprising the wiper contact bank device 22'—23, and the receiving device B, an additional wiper arm 22a is provided on the shaft 68 of the reversing clutch 33, said latter wiper arm being slidable on a contact bank member 23a provided with eight contact segments I' to VIII', similar to the contact bank member 23 of the transmitting device A. The individual contact segments of the contact bank member 23 are connected with the corresponding contact segments of the contact bank member 23a by means of electric wires. A terminal 74 leading to the two holding contacts of the relays R1 and R2 is electrically connected with the wiper arm 22a.

If the plate member 55 is rotated by the auxiliary feeler 6 in clockwise direction so that the wiper arm 22' engages the contact 58, the relay R1 is energized at the beginning of this contact closing step, as described hereinabove. The relay R1 is retained in the energized condition by its holding contact 70. Additionally, the relay R1 closes a contact pair 75 thereby closing the circuit through the winding 62 of the magnetic reversing clutch 33 so that this winding is energized. The electric circuit for the current is then as follows: terminal P of the D.C. network, wiper arm 22', contact brush 76 at the free end of the latter, segment I of the contact bank member 23, segment I' of the contact bank member 23a, wiper arm 22a, terminal 73, closed contact pair 75 of the relay R1, energizing winding 62 of the magnetic reversing clutch 33, and terminal N of the D.C. network. Now the magnetic clutch 33 transmits rotation from the motor 34 to the shaft 68 so that the wiper arm 22a is rotated clockwise, until this wiper arm becomes disengaged from the segment I' of the contact bank member 23a. At said instant the terminal 74 is disconnected from the voltage source and the relay R1 is deenergized, because the holding circuit for the winding of this relay is interrupted. If, however, the auxiliary feeler 6 is displaced through a larger angle, i.e. if plate member 55 is rotated sufficiently so as to cause the brush 76 to engage the segment II, the relay R1 can be deenergized only after the wiper arm 22a followed this angular displacement and no longer engages the contact segment II'. In the same manner, upon rotation of the disc member 55 in counterclockwise direction the energizing winding 63 of the magnetic reversing clutch 33 is controlled by means of the relay R2. The number of contact segments of the contact bank members 23 and 23a may be arbitrarily selected in this device. It is possible to provide suitable transmission ratios in the clutch mechanism in order to obtain exact synchronism. In place of the described adjusting device with a magnetic reversing clutch 33, any other controlling device may be employed. This automatic adjusting device can be used also for hydraulic feeler controls and is independent of the design of the controlling mechanism for the main feeler directing the movements of the working table. The novel adjusting device may be suitably used in the control of welding burners of an automatic welding machine so that the burners remain always normal to the seam to be welded.

What is claimed is:

1. A mechanism for precision control of the movements of a tool performing a predetermined operation on a workpiece in accordance with the scanning of a template, comprising a main feeler element for scanning the contour of said template, an auxiliary feeler in registry with said main feeler element and rotatable about the axis of said main feeler, a tool, adjusting means in registry with said auxiliary feeler and said tool, said adjusting means being responsive to the movements of said auxiliary feeler relative to said main feeler to automatically adjust said tool to assume an orthogonal position with respect to the surface of a workpiece.

2. A mechanism for precision control of the movements of a tool performing a predetermined operation on a workpiece in accordance with the scanning of a template, comprising a main feeler element for scanning the contour of said template, an auxiliary feeler in registry with said main feeler element and rotatable about the longitudinal axis of the latter, a tool, adjusting means in communication with said work tool, control means for actuating said adjusting means cooperable with said auxiliary feeler, said adjusting means being actuated by said control means in response to the movements of said auxiliary feeler relative to said main feeler element to automatically adjust said tool to assume a position at a right angle to the contour of said workpiece.

3. A mechanism for controlling the movements of a tool performing a predetermined operation on a workpiece in accordance with the scanning of a template, comprising a main feeler element adapted to scan the contour of said template, an auxiliary feeler in registry with said main feeler element, and rotatable about the longitudinal axis of the latter, a tool, adjusting means in registry with said tool, control means for actuating said adjusting means and cooperable with said auxiliary feeler, said adjusting means being actuated by said control means in response to the movements of said auxiliary feeler relative to the longitudinal axis of said main feeler element, both said auxiliary feeler and said tool being disposed at right angles to the respective tangent lines taken along the contour of said template and said workpiece.

4. A mechanism according to claim 3, wherein said control means includes a contact bank member and a wiper arm movable relative to said contact bank member and in registry with said auxiliary feeler.

5. A mechanism according to claim 4, wherein said adjusting means includes drive means actuated in response to movement of said contact lever relative to said contact bank member in accordance with scanning of said template by said auxiliary feeler.

References Cited in the file of this patent

FOREIGN PATENTS 505,470     Great Britain _____ May 11, 1939